United States Patent
Ramsey et al.

[11] Patent Number: 5,191,529
[45] Date of Patent: Mar. 2, 1993

[54] TRIP RECORDER OPERATION AND MEMORY RETENTION EXTENSION THROUGH MULTIPLE BATTERY BACKUP AND A LOAD SHEDDING STRATEGY TRIGGERED BY A PRIMARY POWER INTERRUPTION

[75] Inventors: Reno V. Ramsey, Sterling Heights; Paul E. Janos, Troy, both of Mich.

[73] Assignee: Rockwell International Corporation, Pittsburgh, Pa.

[21] Appl. No.: 591,163

[22] Filed: Oct. 1, 1990

[51] Int. Cl.$^5$ .................................................. H02J 9/06
[52] U.S. Cl. .................................... 364/424.04; 320/6; 365/229
[58] Field of Search .................... 364/483, 492, 424.04; 320/6; 365/229; 346/33 D, 33 R

[56] References Cited
U.S. PATENT DOCUMENTS

| | | | |
|---|---|---|---|
| 4,090,122 | 5/1978 | Hoinski | 320/6 |
| 4,399,524 | 8/1983 | Muguruma et al. | 365/229 |
| 4,451,742 | 5/1984 | Aswell | 307/66 |
| 4,617,473 | 10/1986 | Bingham | 307/66 |
| 4,831,595 | 5/1989 | Bone | 365/229 |
| 4,851,756 | 7/1989 | Schaller et al. | 320/3 |
| 4,853,856 | 8/1989 | Hanway | 364/424.01 |
| 4,884,242 | 11/1989 | Lacy et al. | 365/229 |
| 5,019,996 | 5/1991 | Lee | 364/483 |

*Primary Examiner*—Thomas G. Black

[57] ABSTRACT

A dual battery backup system which provides power to selected portions of a trip recorder according to a load shedding strategy to maximize duration of operation and data retention in the event of interruption of primary power supply. The trip recorder is divided into three subsystems; a central processing unit, input/output and memory/clock subsystems. In the event of interruption of power from the vehicle battery, backup power is supplied to all systems according to a load shedding strategy. Power supplied to the input/output subsystem and the central processing unit are interrupted after the passage of predetermined amounts of time. The memory subsystem receives power after all other subsystems have been shed enabling memory retention for a period of up to ten years.

10 Claims, 1 Drawing Sheet

TRIP RECORDER OPERATION AND MEMORY RETENTION EXTENSION THROUGH MULTIPLE BATTERY BACKUP AND A LOAD SHEDDING STRATEGY TRIGGERED BY A PRIMARY POWER INTERRUPTION

BACKGROUND OF THE INVENTION

This invention relates generally to battery backup systems for trip recorders and, more specifically, to multiple battery backup systems which provide standby power supply to selected sub-systems in a prioritized schedule which seeks to maximize the duration of operation and retention of non volatile memory.

DESCRIPTION OF THE RELATED ART

Trip recorders are used on mobile vehicles to gather information concerning method and manner of operation. The information can be of many different forms including speed, time at stops, mileage, fuel purchases, engine temperature, oil pressure, etc. Trip recorders may be used to monitor activities of tractor-trailers, railroad cars, buses, planes, ships and any other type of transportation apparatus. Information gathered by a trip recorder may be used to aid the vehicle owner in management and supervision of a vehicle that is miles away from the location of dispatch. In this manner, a trip recorder is capable of monitoring and reporting unauthorized usage of the respective vehicle. Consequently, the trip recorder is susceptible to sabotage ranging from physical damage to mere interruption of power supply. Systems are currently available to provide internal battery backup in the event of power interruption. The most popular of such systems includes a nickel cadmium battery backup which is capable of providing twelve hours of full system operation. The system includes a feature which implements a load shedding strategy after 12 hours which sheds elements of the system operation leaving only memory and clock chip operation. The disadvantage of such a system is that the nickel cadimium battery must provide energy for the microprocessor operation as well as energy to accomplish memory retention. Fulfilling these dual functions results in a compromise to the total life over which the system can maintain operation and retain data. Another system available to provide battery backup utilizes a lithium battery backup and sheds all subsystems immediately upon interruption of primary power leaving only memory and clock chip operation. Such systems can function for up to ten years. The disadvantage of such a system is that microprocessor operation and, consequently, data collection is immediately interrupted upon interruption of primary power. Thus, any data collected by sensors and supplied to the microprocessor input during backup mode is ignored. Therefore, there is a need for a battery backup that permits temporary microprocessor operation and long term memory storage.

SUMMARY OF THE INVENTION

The present invention includes a dual battery backup system which provides power to selected portions of a trip recorder according to a load shedding strategy to maximize duration of operation and data retention in the event of interruption of primary power supply. The trip recorder is divided into three subsystems; a central processing unit, input/output and memory/clock subsystems. In the event of interruption of power from the vehicle battery, backup power is supplied to all systems according to a load shedding strategy. Power supplied to the input/output subsystem and the central processing unit are interrupted after the passage of predetermined amounts of time. The memory subsystem receives power after all other subsystems have been shed enabling memory retention for a period of up to ten years.

The preferred embodiment of the present invention features a power backup system for providing backup power to selected portions of a trip recorder having a microcontroller with subsystems including input/output, memory and a central processing unit. The power backup being provided according to a load shedding strategy which seeks to maximize duration of operation and data retention in the event of interruption of primary power supply comprising, a first power storage device, a second power storage device wherein the primary power supply and the first power storage device are connected to the input/output and the central processing unit via a first OR gate, the first and said second power storage device are connected to memory via a second OR gate, the first OR gate provides power from either the primary power supply or the first power storage device whichever offers the greatest voltage and the second OR gate providing power from either the first or second power storage device whichever offers the greatest voltage.

In another embodiment of the present invention, the power backup system provides power to selected portions of a trip recorder having a microcontroller with subsystems including input/output, memory and a central processing unit. The backup power being provided according to a load shedding strategy which seeks to maximize duration of operation and data retention in the event of interruption of primary power supply comprising a first OR gate connected to a first backup power storage device and the primary power supply. A second OR gate is connected to a second backup power storage device and said first OR gate. A first switch for selectably providing power to the central processing unit from said first OR gate and a second switch for selectively providing power to the input/output from said first OR gate, the second OR gate connected to the memory and means for controlling the first and second switch to enable implementation of a load shedding strategy upon the incidence of interruption of the primary power supply.

These and other aspects of the present invention will become more readily apparent by reference to the following detailed description of the embodiments as shown in the drawing.

DETAILED DESCRIPTION OF THE DRAWINGS

Figure 1:
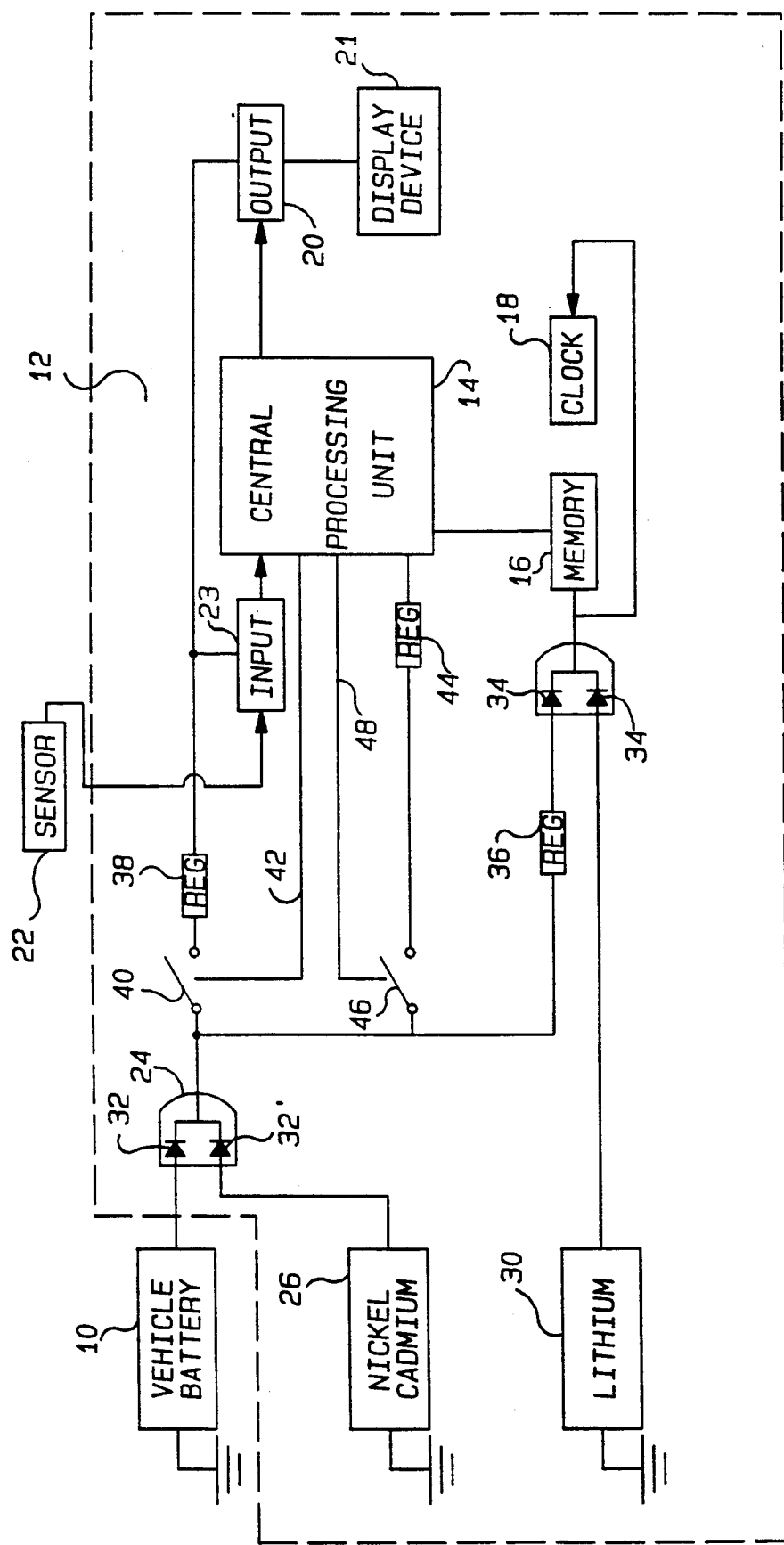

FIG. 1 is a flow diagram of the system indicating primary power source and dual power backup along with trip recorder delineated into subsystems.

DESCRIPTION OF THE PREFERRED EMBODIMENT

The preferred embodiment of the present invention, as illustrated in FIG. 1, includes a vehicle battery 10 which provides the primary power supply for operation of trip recorder 12. Trip recorder 12 includes central processing unit (CPU) 14 preferably an INTEL CMOS microcontroller TP80C51FA having separate memory 16 preferably a CMOS static RAM available from Motorola and clock chip 18 preferably an OKI CMOS real time clock #M6242BRS. Output 20 is a separate driver device comprising a RS422 buffer. Output 20 provides a signal appropriate for communicating with external display device 21 such as a TRIPMASTER keypad display device. TRIPMASTER is a registered trademark of Rockwell International. Input 23 is a separate device preferably comprising a CMOS comparator TLC3702IP. Input 23 receives signals from sensors 22 which provide data such as vehicle speed, engine RPM, etc. Each of the separate components; CPU 14, output 20, input 23, memory 16 and clock 18 receive power independently from switchable sources. Battery backup is provided to trip recorder 12 from two sources. The first backup power source is battery 26 which is connected to CPU 14 through OR gate 24. Battery 26 is preferably a 7 cell nickel cadmium battery which provides an 8.4 volt power supply at full charge. OR gate 24 is a pair of IN4004 diodes 32, 32' which function to select power supply from battery 10 or battery 26, whichever provides the highest voltage. The second backup power source is battery 30 which is connected to memory 16 and clock chip 18 through OR gate 28. Battery 30 is preferably a single cell lithium battery which provides a 3½ volt power supply at full charge. OR gate 28 includes diodes 34, 34' which are preferably Schottky diodes LL101A. OR gate 28 functions to effect a selection of power from the source providing the highest voltage (either nickel cadmium battery 26 or lithium battery 30). CPU 14 power is provided via regulator 44. Regulator 44 is preferably a SGSL4947 which is a low voltage drop out regulator. Input 23 and output 20 receive energy via regulator 38. Regulator 38 is preferably a SGSL4805 which is also a low voltage drop out regulator. Regulators 38, 44 provide a continuously regulated 5 volts. Switches 40, 46 preferably comprise a Motorola MC3399T which include latching features which effect a latched switch upon receipt of an appropriate command signal on lines 42, 48, respectively.

In operation, CPU 14 will produce a latch signal and communicate the signal along lines 42, 48 to maintain switches 40, 46 closed. In the event of an interruption in supply of power from vehicle battery 10, CPU 14 will initiate a timer. After the passage of a predetermined amount of time, the latch signal is removed from line 42 interrupting power supplied to input 23 and output 20. Interrupting power to input 23 and output 20, while continuing to maintain power to CPU 14, permits continued processing of data while reducing partial load on nickel cadmium battery 26. After the passage of an additional amount of time, the latch signal is removed from line 48 causing switch 46 to open, thereby interrupting power supplied to CPU 14. At this point, power is supplied to the memory and clock chip only via OR gate 28. Diodes 34, 34' will effect a selection of power supplied from batteries 26 or 30. In this manner an accidental or intentional interruption of power supply from vehicle battery 10 will initiate the multiple battery backup and load shedding strategy which results in extension of duration of trip recorder operation and data retention.

One skilled in the art will readily recognize that certain specific details shown in the foregoing specification and drawings are exemplary in nature and subject to modification without departing from the teachings of the disclosure. Various modifications of the invention discussed in the foregoing description will become apparent to those skilled in the art. All such variations that basically rely on the teachings through which the invention has advanced the art are properly considered within the spirit and scope of the invention.

I claim:

1. A power backup system for providing backup power which provides power to selected portions of a trip recorder having a microcontroller with subsystems capable of independent operation with separate power application including input/output, memory and a central processing unit, said power backup being provided according to a load shedding strategy which seeks to maximize duration of operation and data retention in the event of interruption of primary power supply comprising:

a first power storage device;
 a second power storage device;
 said primary power supply and said first power storage device are each input to a first OR gate;
 said first OR gate having an output connected to said input/output and said central processing unit;
 an output of said first OR gate and said second power storage device are each input to a second OR gate;
 said second OR gate having an output connected to said memory;
 said first OR gate providing power from either said primary power supply or said first power storage device whichever offers the greatest voltage;
 said second OR gate providing power from either said first or said second power storage device whichever offers the greatest voltage; and
 said first and second OR gate comprising a diode in series with each of said primary power supply, and said first and said second power storage devices.

2. The invention of claim 1 wherein said first power supply is nickel cadmium storage battery.

3. The invention of claim 1 wherein said second power supply is lithium battery.

4. The invention of claim 1 further comprising a first switch means capable of interrupting power supplied to said input/output and a second switch means capable of interrupting power supplied to said memory.

5. The invention of claim 4 wherein said first switch interrupts power supplied to said input/output after the passage of a first predetermined amount of time from said interruption of said primary power supply.

6. The invention of claim 4 wherein said second switch interrupts power supplied to said central processing unit after the passage of a second predetermined amount of time from said interruption of primary power supply.

7. The invention of claim 4 wherein said first switch interrupts power supplied to said input/output after the passage of a first predetermined amount of time from interruption of said primary power supply and after passage of a second predetermined period of time said second switch interrupts power supplied to said central processing unit.

8. A power backup system which provides power to selected portions of a trip recorder having a microcontroller with subsystems capable of independent operation with separate power application including input/output, memory and a central processing unit, said backup power being provided according to a load shedding strategy which seeks to maximize duration of operation and data retention in the event of interruption of primary power supply comprising:

a first OR gate having a pair of inputs including a first backup power storage device and said primary power supply;

a second OR gate having a pair of inputs including a second backup power storage device and an output of said first OR gate;

a first switch means for selectably providing power to said central processing unit from said first OR gate;

a second switch means for selectably providing power to said input/output from said first OR gate;

output of said second OR gate connected to said memory; and means for controlling said first and second switch to open said first switch after passage of a first predetermined amount of time from interruption of said primary power supply and open said second switch after passage of a second predetermined amount of time.

9. The invention of claim 8 wherein said first power storage means is nickel cadmium storage battery.

10. The invention of claim 8 wherein said second power storage means is lithium storage battery.

* * * * *